Patented Nov. 23, 1948

2,454,510

UNITED STATES PATENT OFFICE 2,454,510

METHOD OF FORMING A COFFEE CONCENTRATE

Wilbert A. Heyman, New York, N. Y.

No Drawing. Application October 14, 1944, Serial No. 558,733

11 Claims. (Cl. 99—71)

My invention comprises a novel process for obtaining coffee concentrates of greatly enhanced flavor and aroma, and more particularly my invention comprises a process for making a coffee concentrate in which the volatile aromatic principles of coffee are retained for increased flavor and aroma.

This application is a continuation-in-part of applicant's copending application Ser. No. 381,061, filed February 28, 1941, now Patent No. 2,360,342.

Coffee concentrates have been made by a variety of processes but insofar as their optimum flavor and aromatic properties are concerned they have one outstanding deficiency. This deficiency lies in their lack of a real full bodied aroma such as is found in a cup of coffee freshly brewed from freshly roasted and ground coffee. Although the coffee made from coffee concentrates has a certain desirable flavor factor, it has never been possible to obtain quite the proper aroma factor and this has retarded the acceptance of coffee concentrates since the aroma in coffee is a quality of equal importance with the flavor principles of the coffee.

It is the object of my invention to make a coffee concentrate that will produce a coffee beverage having a high and desirable coffee aroma.

It is a further object of my invention to produce a coffee concentrate that can be used to make a coffee beverage with an aroma substantially equivalent to a coffee beverage brewed from freshly roasted and ground coffee.

It is a further object of the present invention to enhance the flavor as well as the aroma of the beverage produced from a coffee concentrate.

It is a further object of the present invention to economically employ all desirable aromatic and flavor principles derivative from roasted and ground coffee in the manufacture of a coffee concentrate.

I achieve the objects of my invention by (a) plunging the roasted coffee at the peak of its roasting temperature into a liquid designed to release and entrap aromatic coffee principles, (b) by grinding roasted coffee while in the liquid which entraps aromatic coffee principles given off during the grinding and (c) by concentrating as specifically described hereinafter.

Other objects of my invention will be apparent from the general and specific description of my invention which here follows.

In the manufacture of my coffee concentrate I roast coffee to a temperature of about 425° F. for a period of time which varies according to the type of roaster and degree of roast of the coffee, but which may for example be from ten to fourteen minutes, but which at times may last as long as 25 minutes, e. g., a French roast.

I have found that I can entrap the desirable coffee volatiles or impart to liquid coffee concentrate a greatly enhanced flavor characteristic of fresh roasted coffee by plunging hot roasted coffee beans directly from the roasting apparatus, the beans being heated to approximately 425° F., into a solution in which the volatiles are soluble such as corn syrup and water or aqueous solution of coffee solubles and corn syrup or into a finished coffee concentrate (25° Bé.).

I use about one and one quarter pounds of finished roasted coffee to each quart of liquid coffee concentrate or entrapping solution. I prefer to have my entrapping solution, such as liquid coffee concentrate as cold as possible, e. g. at a temperature of approximately 32° F., and surrounded by a cooling material such as brine so that the heat generated from the hot roasted coffee will not appreciably raise the temperature of the concentrate and so that the concentrate can be quickly cooled again. The cold extract thus assists in the condensation of the coffee volatiles.

As the hot roasted coffee strikes the cold liquid concentrate, steam is generated. The steam acts to steam distill the fresh coffee flavor and aroma which flavor and aroma are immediately condensed and asborbed by the liquid coffee concentrate. I allow the roasted coffee beans to remain in contact with the liquid coffee concentrate for a period of about an hour so that a substantial amount of the coffee aroma and flavor can diffuse out of the roasted bean into the liquid coffee.

It is a well known fact that when coffee is freshly roasted it contains a pressure of carbon dioxide of approximately one hundred pounds to the square inch. The water of the liquid concentrate acts to soften the cellular structure of the roasted coffee thereby permitting the gas of the coffee to escape in the liquid coffee and carrying with it certain of the flavor and aromatic principles of the coffee. After one hour, I centrifuge the roasted coffee beans to remove as much of the concentrate as possible from the coffee bean.

When the coffee volatiles have been absorbed for the desired period of time, I grind the freshly roasted coffee in the presence of sufficient water or aqueous coffee solution (the making of which will be described later herein) or C. S. U. and water or aqueous solution of coffee solubles and C. S. U. so that as the coffee is broken up in the grinding process, the volatile flavors released during the grinding of the coffee are entrapped and dissolved in the cold aqueous coffee solution or retaining solution. These volatiles normally are lost during a dry grind, i. e. the grind usually employed in grinding roasted coffee.

I add twenty-one gallons of ice cold water at a temperature of below 40° F. to one hundred pounds of freshly roasted coffee while grinding, the grinding of the coffee being effected to a socalled silex grind, which is an extremely fine grind. The twenty-one gallons of cold water is sufficient to pick up and entrap substantially all of the volatiles released during the grinding. I allow the ground coffee to soak in the water for a period of about one hour so that a maximum of the volatiles and solubles within the coffee are leached out and absorbed by the water. After a sufficient period of time has elapsed I effect the separation of the coffee solubles and the important volatiles in the water solution from the residual coffee insoluble solids in any desired manner such as by filtration or any other manner known in the art. From the grinding and leaching of one hundred pounds of coffee with twenty-one gallons of cold water in the method indicated, I obtain nine and one-half gallons of coffee extract of 10.2° Brix which corresponds to a 10.4% extraction of solids from the coffee.

I immerse the separated residual coffee solids in a second water solution to effect a further leaching out of the solubles and volatiles that may remain therein using a hot water at a temperature of about 160–190° F. for a period of one hour. I then again separate the water solution of coffee solubles and volatiles from the solid coffee residue by any separation means well known in the art. I obtain by this hot water leaching of the residual coffee solids (from the cold water leaching) using, for example, twenty-one gallons of hot water at a temperature of about 160–190° F., twelve and one-half gallons of aqueous coffee extract of five and one-half Brix.

To obtain the largest possible yield of soluble coffee solids I again subject the residual coffee solids which have come through the cold water and the hot water leaching above described to a third leaching using 21 gallons of boiling water at a temperature for example 200 to 220° F. The residual coffee solids are subjected to this boiling water for a period of time sufficient to extract all of the soluble coffee solids and I find that I obtain from this third extract 19 gallons of aqueous coffee solution of 2.7 Brix.

I may precool to 32° F. and use this 2.7 Brix ice cold aqueous coffee solution or a still lower concentration coffee solution obtained by a still further hot water leaching of the residual coffee solids in the first cooling, grinding and leaching operation described above. That is, in lieu of plain water I may use a low concentration solution of coffee solids as the medium in which the coffee is ground and originally leached to pick up the coffee volatiles and to leach out the coffee solubles in cold solution.

To prepare the solution so that it may be without substantial loss of desirable components, I either add corn syrup first to the aqueous coffee concentrate and then further concentrate to 40 Brix or concentrate the aqueous coffee solution to 30 Brix by freezing and then add corn syrup to it to make a concentration of 40 Brix.

Any method of obtaining the necessary concentration of solution without boiling and consequent evaporation may be employed. For example, I may add to the 20 Brix coffee solids solution sufficient freshly roasted ground coffee to raise the Brix of that solution about 30. This is separated from the grounds by any desired method and mixed with C. S. U. to make a 40 Brix coffee—C. S. U. solution.

I then spray dry the 40 Brix solution of coffee solids alone or coffee solids and corn syrup. By the process set forth I retain the maximum quantity of desirable volatile flavor and aroma elements in the coffee which are released only when the dried powder is mixed with hot water to form a coffee beverage.

It is the primary purpose of my present invention to retain in the coffee extract as much as possible of those volatile flavor and aroma elements that are present either in the gaseous or solid form in the coffee bean and to this end I entrap the volatiles given off during the grinding of the coffee bean either by grinding in soluble coffee solids solution as described above or by immersing the coffee while it is being ground in a solution of soluble coffee solids and corn syrup, the corn syrup having a peculiar and desirable quality of entrapping and retaining fugitive aroma and flavor elements released from the coffee during the grinding. The proportion of corn syrup to water should be such that there are about 20–30 per cent of corn syrup solids present in the solution.

The medium which I prefer to employ to entrap the volatiles released during the grinding comprises a water solution of soluble coffee solids and corn syrup solids (which are soluble in water) since both the corn syrup solids and the coffee soluble solids have an unusual facility for picking up and retaining the fugitive volatile and flavor elements which I desire to retain.

By using the successive higher temperature extracting or leaching solutions to leach out the solubles from the ground coffee, I obtain the maximum extraction of the desirable elements of the coffee bean and substantially all of the soluble substances that can be extracted.

It is to be understood of course that the solution of coffee solubles and volatile flavor and aroma elements with or without corn syrup as described hereinabove may be employed in the liquid concentrate form or may be dehydrated by any means known in the art of which I have exampled spray drying.

The steps and concentrations I have set forth hereinabove are particularly adapted to enable the dehydration to be effected without the customary substantial loss of volatile elements.

It is a well known fact that roasted coffee becomes stale in a relatively short period of time unless it is protected by vacuum. However, when the vacuum is broken, the coffee becomes stale if not used within a period of a few days. In my Patent No. 2,154,447, I have pointed out that the cause of this deterioration is due to the presence of a very objectionable flavor as found in the germ cell and that this objectionable flavor becomes more and more pronounced in direct proportion to the loss of the volatile flavor in the coffee. I have found that when I impregnate freshly roasted coffee with a suitable edible solvent such as glycerine that the solvent absorbs the volatile flavor thereby preventing its loss so that coffee which has been impregnated with glycerine retains its fresh flavor. I have found that when I add five lbs. of glycerine to 100 lbs. of freshly roasted coffee and then grind it, or alternatively if I add 5 lbs. of glycerine to 100 lbs. of roasted ground coffee, this is sufficient to absorb and hold all of the volatile flavors of the coffee while it, itself, is absorbed into the coffee without being apparent.

I have found that by mixing one part of pure soluble coffee product to five parts of ground roasted coffee which has been impregnated with about 5% by weight of glycerine that it will produce a more highly concentrated product, which requires only .2 to .25 of an ounce to make a cup of delicious coffee. I have found that when I place .25 of an ounce of this mixture into an ordinary cotton gauze or paper tea ball, that it will produce a cup of delicious coffee by simply pouring boiling hot water over the ball in a cup.

In previous attempts to produce a coffee ball from which coffee could be prepared, the objectionable feature has always been that the roasted coffee loses its volatile flavor and then acquires a stale flavor. Many attempts have been made in the past to market a coffee ball but all of them have failed because of this objectionable feature. I have found that the steps set forth herein retain the delightful flavor and aroma of freshly roasted coffee for a much longer period of time than has been possible in the past.

When the process to be followed is that of making a dry powder as set forth in my copending application Serial No. 381,061, now Patent No. 2,360,342, in order to enhance the flavor of the coffee component which is the essential flavor and aroma ingredient of my product, I have found the two following procedures to be extremely effective. Although these procedures are mentioned here with specific reference to the coffee-corn syrup product of my invention, it is to be understood that they are applicable to the formation of coffee extracts and coffee concentrates generally.

After the steam has been passed through the ground and roasted coffee to distill off therefrom the volatile constituents, certain of the volatile constituents may still remain trapped within the cells of the ground coffee. In order to remove substantially all of this volatile flavor substance, I then subject the entire system to a high vacuum while at the same time continuing the injection of dry steam in order to draw off as much of the volatile flavor substances as possible which will expand and escape through the porous cellular structure of the coffee. These extracted volatiles are then passed through the same trapping system so that the resulting condensables are added to the previously obtained condensables and the volatile relatively non-condensables are absorbed in the corn syrup.

I have further found that I can impart to liquid coffee concentrate a greatly enhanced flavor characteristic of fresh roasted coffee by plunging hot roasted coffee beans directly from the roasting apparatus, the beans being heated to approximately 425° F. into the finished coffee concentrate (25° Bé.).

I use about one and one quarter pounds of finished roasted coffee to each quart of liquid coffee concentrate. I prefer to have my liquid coffee concentrate as cold as possible, e. g. at a temperature of approximately 32° F., and surrounded by a cooling material such as brine so that the heat generated from the hot coffee will not appreciably raise the temperature of the concentrate and so that the concentrate can be quickly cooled again. The cold extract thus assists in the condensation of the coffee volatiles.

As the hot roasted coffee strikes the cold liquid concentrate, steam is generated. The steam acts to steam distill the fresh coffee flavor and aroma which flavor and aroma are immediately condensed and absorbed by the liquid coffee concentrate. I allow the roasted coffee beans to remain in contact with the liquid coffee concentrate for a period of about an hour so that a substantial amount of the coffee aroma and flavor can diffuse out of the roasted bean into the liquid coffee.

It is a well known fact that when coffee is freshly roasted it contains a pressure of carbon dioxide of approximately one hundred pounds to the square inch. The water of the liquid concentrate acts to soften the cellular structure of the roasted coffee thereby permitting the gas of the coffee to escape in the liquid coffee and carrying with it certain of the flavor and aromatic principles of the coffee. After one hour, I centrifuge the roasted coffee beans to remove as much of the concentrate as possible from the coffee bean. I then grind the roasted coffee and subject it to the various processes of extraction as previously herein outlined.

I may then, if I desire to produce a powder concentrate, proceed to dry the liquid coffee extract at as high a vacuum as possible and at as low a temperature as possible in order to remove all moisture and produce a dry soluble concrete coffee.

Alternatively for the particular purposes of producing the dry coffee corn syrup powder, which is the subject of the present invention, I may entrap these desirable aromatic principles and flavor elements of the freshly roasted coffee in corn syrup by plunging such roasted coffee beans directly from the high temperature of the roaster into the cooled corn syrup containing the previously absorbed volatile condensable constituents and volatile relatively non-condensable constituents whereupon the hot freshly roasted coffee bean coming in contact with the cool corn syrup causes the formation of steam and the release of the desirable aromatic and volatile principles contained in the coffee bean which elements are picked up and retained by the corn syrup.

By suitable extraction means I may then remove the coffee beans from the corn syrup and combine the corn syrup containing these aromatic principles with the soluble coffee solids extracted as above set forth.

The operations presently described may take place either before or after the volatile condensables of the coffee have been added to the corn syrup.

As set forth above, this process of securing the aromatic principles and flavor elements of the freshly roasted coffee bean has general application entirely aside from its particular application to the corn syrup process presently described.

The solid dehydrated coffee-corn syrup powder of my invention when dissolved, for example, with hot water to form a coffee beverage is characterized by a superior taste and aroma, both because of the combination of the flavor preserving and retaining effect of the corn syrup with the coffee elements and also because of the fact that the essential flavor and aroma elements of the coffee have been separated out and recombined so as to be retained by the corn syrup.

The new and unexpected advantages resulting from the formation of this coffee corn syrup combination in expanded intercommunicating cell form have been set forth above. It will be understood that the specific procedures above set forth and the proportions recited may be modified in many different ways by those skilled in the art. I intend therefore to be limited not by the specific disclosure herein but only by the claims hereto appended.

I claim:

1. The method of forming a coffee concentrate which comprises heating coffee to a roasting temperature, quenching the hot roasted coffee with a solution comprising corn syrup so that the volatile coffee constituents given off during this quenching are retained by the corn syrup, and separating the solid, insoluble residual coffee from the liquid solution containing the volatile flavors.

2. The method of forming a coffee concentrate which comprises heating coffee to a roasting temperature, quenching the hot roasted coffee with a quenching solution containing corn syrup and soluble coffee solids so that the volatile coffee constituents given off during the quenching are retained by the corn syrup and soluble coffee solids, grinding the roasted coffee in the presence of the quenching solution and separating the solid, insoluble, residual coffee from the liquid solution containing the volatile flavors.

3. The method of forming a coffee concentrate which comprises heating coffee to a roasting temperature, quenching the hot roasted coffee with a quenching solution containing corn syrup so that the volatile coffee constituents given off during the quenching are retained by the corn syrup, grinding the roasted coffee in the presence of the quenching solution and separating the solid, insoluble residual coffee from the liquid solution containing the volatile flavors.

4. The method of forming a coffee concentrate which comprises heating coffee to a roasting temperature, quenching the hot roasted coffee with a quenching solution containing corn syrup and soluble coffee solids so that the volatile coffee constituents given off during the quenching are retained by the corn syrup and soluble coffee solids, grinding the roasted coffee in the presence of the quenching solution, leaching the roasted coffee in the quenching solution and separating the solid, insoluble, residual coffee from the liquid solution containing the volatile flavors.

5. The method of forming a coffee concentrate which comprises heating coffee to a roasting temperature, quenching the hot roasted coffee with a quenching solution containing corn syrup and soluble coffee solids so that the volatile coffee constituents given off during the quenching are retained by the corn syrup and soluble coffee solids, grinding the roasted coffee in the presence of the quenching solution, leaching the roasted coffee in the quenching solution and separating the solid, insoluble, residual coffee from the liquid solution containing the volatile flavors, and concentrating the coffee solution thus formed.

6. The method of forming a coffee concentrate which comprises heating coffee to a roasting temperature, quenching the hot roasted coffee with a quenching solution containing corn syrup and soluble coffee solids so that the volatile coffee constituents given off during the quenching are retained by the corn syrup and soluble coffee solids, grinding the roasted coffee in the presence of the quenching solution, adding sufficient soluble coffee solids so that the soluble coffee solids in solution are substantially equal to the corn syrup solids in solution, and separating the solid, insoluble, residual coffee from the liquid solution containing the volatile flavors, and concentrating the liquid coffee-corn syrup solution so obtained.

7. The method of forming a coffee concentrate which comprises heating coffee to a roasting temperature, quenching the hot roasted coffee with a quenching solution containing corn syrup and water so that the volatile coffee constituents given off during the quenching are retained by the corn syrup and water, positively cooling the mix during the quenching so as to maintain its temperature substantially constant, grinding the roasted coffee in the presence of the quenching solution, separating the undissolved coffee solids from the aqueous solution, leaching said undissolved coffee solids residue to extract the coffee solubles therefrom, and utilizing the last named solution of coffee solubles to make up a new quenching solution.

8. The method of forming a coffee concentrate which comprises heating coffee to a roasting temperature, quenching the hot roasted coffee with a quenching solution having a temperature of around 32° F. and containing soluble coffee solids so that the volatile coffee constituents given off during the quenching are retained by the solution of soluble coffee solids, grinding the roasted coffee in the presence of the quenching solution, separating the undissolved coffee solids from the aqueous solution, leaching the solid coffee residue to extract the coffee solubles therefrom, and concentrating the quenching solution of soluble coffee solids.

9. The method of forming a coffee concentrate which comprises heating coffee to a roasting temperature, quenching the hot roasted coffee with a cold quenching solution containing soluble coffee solids so that the volatile coffee constituents given off during the quenching are retained by the solution of soluble coffee solids, grinding the roasted coffee in the presence of the quenching solution, separating the undissolved coffee solids from the aqueous solution, subjecting the separated coffee solid residue to hot water to leach out substantially all of the coffee solubles therefrom, and concentrating the solutions of soluble coffee solids.

10. The process of enhancing the flavor of a liquid coffee concentrate which comprises roasting coffee beans and plunging said roasted coffee beans while still hot in an excess of liquid coffee concentrate and separating the solid, insoluble, residual coffee from the liquid solution containing the volatile flavors.

11. The process of enhancing the flavor of a liquid coffee concentrate which comprises roasting coffee beans and plunging said roasted coffee beans while still heated to roasting temperature into an excess of a relatively cold liquid coffee concentrate and separating the solid, insoluble, residual coffee from the liquid solution containing the volatile flavors.

WILBERT A. HEYMAN.

REFERENCES CITED

The following references are of record in the file of this patent:

UNITED STATES PATENTS

| Number | Name | Date |
| --- | --- | --- |
| 229,697 | Gue et al | July 6, 1880 |
| 726,279 | Giacomini | Apr. 28, 1903 |
| 1,093,962 | Allison | Apr. 21, 1914 |
| 1,123,828 | Whitaker et al | Jan. 5, 1915 |
| 1,525,272 | Darrah | Feb. 3, 1925 |
| 1,716,323 | Rector | June 4, 1929 |
| 1,836,931 | Meyer et al | Dec. 15, 1931 |
| 1,866,414 | Lorand | July 5, 1932 |
| 1,866,415 | Lorand | July 5, 1932 |
| 2,162,033 | Schulze | June 13, 1939 |
| 2,168,797 | Havis | Aug. 8, 1939 |
| 2,306,061 | Redmond | Dec. 22, 1942 |
| 2,340,235 | Tribuno | Jan. 25, 1944 |
| 2,379,427 | Fetzer | July 3, 1945 |